United States Patent
Skinner (10) Patent No.: US 10,441,977 B2
(45) Date of Patent: Oct. 15, 2019

(54) SINGLE STREAM OF AIR FOR SEPARATING MIXED WASTE STREAM INTO THREE FRACTIONS

(71) Applicant: Matthew J. Skinner, Raymond, NH (US)

(72) Inventor: Matthew J. Skinner, Raymond, NH (US)

( * ) Notice: Subject to any disclaimer, the term of this patent is extended or adjusted under 35 U.S.C. 154(b) by 162 days.

(21) Appl. No.: 15/611,977

(22) Filed: Jun. 2, 2017

(65) Prior Publication Data

US 2018/0345322 A1    Dec. 6, 2018

(51) Int. Cl.
| | |
|---|---|
| *B07B 9/02* | (2006.01) |
| *B07B 4/02* | (2006.01) |
| *B07B 7/06* | (2006.01) |
| *B07B 1/52* | (2006.01) |

(Continued)

(52) U.S. Cl.
CPC ............. *B07B 9/02* (2013.01); *B07B 1/524* (2013.01); *B07B 4/02* (2013.01); *B07B 7/06* (2013.01); *B07B 1/10* (2013.01); *B07B 1/22* (2013.01)

(58) Field of Classification Search
CPC .. B07B 1/10; B07B 1/22; B07B 1/524; B07B 4/02; B07B 7/06; B07B 9/02
See application file for complete search history.

(56) References Cited

U.S. PATENT DOCUMENTS

| | | | |
|---|---|---|---|
| 4,844,235 A * | 7/1989 | Sherman ................... | B07B 4/02 198/688.1 |
| 5,375,721 A * | 12/1994 | LaVigne ................... | B03B 4/04 209/131 |

(Continued)

FOREIGN PATENT DOCUMENTS

| | | |
|---|---|---|
| CH | 575 785 A5 | 5/1976 |
| DE | 3726808 A1 | 2/1989 |

OTHER PUBLICATIONS

Shubov L.J.A. et al., "Tekhnologija Otkhodov (Tekhnologicheskie Prozessy V Servise)", Moskva, 2006, pp. 154-155, See International Search.

(Continued)

*Primary Examiner* — Joseph C Rodriguez
*Assistant Examiner* — Kalyanavenkateshware Kumar
(74) *Attorney, Agent, or Firm* — Davis & Bujold PLLC; Michael J. Bujold (57) ABSTRACT

Separation and classification equipment for separating a mixed waste stream into first, second and third fractions. The equipment comprises a feeding member for feeding the waste stream toward a gap and a blower for discharging a stream of air for mixing with the waste stream, as the waste stream falls through the gap. The first fraction falls through the stream of air and collects in a first collection area while the stream of air carries away the second and the third fractions. A rotatable permeable member is arranged to permit the stream of air to pass therethrough and thereby force and retain the third fraction against a surface of the rotatable permeable member and be conveyed, by the rotatable permeable member, toward a third collection area while the second fraction tends to separate, from the rotatable permeable member and the third fraction, and collect in a separate second collection area.

20 Claims, 6 Drawing Sheets

(51) Int. Cl.
  *B07B 1/10*  (2006.01)
  *B07B 1/22*  (2006.01)

(56) References Cited

U.S. PATENT DOCUMENTS

| | | | | |
|---|---|---|---|---|
| 5,429,248 A * | 7/1995 | Le Gigan | ................... | B07B 1/24 |
| | | | | 209/239 |
| 5,513,805 A * | 5/1996 | Fisher | ....................... | B07B 1/20 |
| | | | | 209/23 |
| 8,910,798 B2 * | 12/2014 | Benjamins | ............ | B07B 13/003 |
| | | | | 209/643 |
| 2012/0048975 A1 * | 3/2012 | Gitschel | ................... | B02C 23/08 |
| | | | | 241/24.13 |
| 2014/0346098 A1 * | 11/2014 | Thielepape | ............... | B07B 9/02 |
| | | | | 209/639 |
| 2015/0209830 A1 * | 7/2015 | Edwards | ................. | B29B 17/02 |
| | | | | 209/3 |
| 2016/0067744 A1 * | 3/2016 | Snyder | ..................... | B07B 4/08 |
| | | | | 209/19 |

OTHER PUBLICATIONS

International Search Report Corresponding to PCT/US2018/034585 dated Sep. 6, 2018.
Written Opinion Corresponding to PCT/US2018/034585 dated Sep. 6, 2018.

* cited by examiner

SINGLE STREAM OF AIR FOR SEPARATING MIXED WASTE STREAM INTO THREE FRACTIONS

FIELD OF THE INVENTION

The present invention relates to an apparatus and a method which facilitate separation of a mixed waste stream into a first portion comprising a heavier weight material or fraction, a second portion comprising a lightweight material or fraction, and a third portion comprising a super lightweight material or fraction thereby to assist with segregation of the mixed waste stream into three separate waste streams which facilitates further processing and/or recycling thereof.

BACKGROUND OF THE INVENTION

Current air classifiers separate the heavy fraction from a light fraction by using an air curtain to blow the lighter fraction over a gap while the heavier falls down through the gap prior to a receiving surface for the lights, which can be a fixed or adjustable splitter plate, rotating drum, or conveyor. Some current designs also try to capture the lights fraction 'superlights' (plastic and paper) from the overall lights fraction that got previously blown over the gap by the initial air curtain, by means of additional suction air or a second air curtain in the area of the airborne superlights over the lights fraction. This method is marginally effective and makes the equipment much more complex to filter the air curtain air in an enclosed system, or collect and separate the air from super lights in an open system.

There are currently two styles of air classifiers, one that is open where the blower for the air curtain draws fresh air from outside the classifier and exhausts air, utilized for separating the heavy from the lights, out to atmosphere after the separation. The second style is an enclosed or closed system where the blower fan for the air curtain draws air from the a rear section of the unit where an expansion chamber collects the air which was utilized for the separation of rotatable permeable member. This enclosed or closed system will often have air filtration system that will continuously filter a recycled air and exhaust a portion of the recycled air to the atmosphere. This exhausted portion of is replaced with fresh air entering the system.

Materials separated by air classifiers typically do so by density separation of the materials through an air curtain or multiple curtains into two or possibly three fractions. Examples of the material to be separated are, for example, rock and aggregate as heavies which are separated from wood, plastic, paper as the lights; metals as heavies which are separated from plastics as lights; glass, metals and rock as heavies which are separated from paper, cardboard, and plastic as lights; rock as heavies which are separated from mulch or compost as lights; and mulch or compost as heavies which are separated from paper and plastic as lights. From each of the above lights fractions, it is desirable to segregate or separate the lights into both a light fraction and a super light fraction.

SUMMARY OF THE INVENTION

Wherefore, it is an object of the present invention to overcome the above mentioned shortcomings and drawbacks associated with the prior art fraction separation equipment and systems.

An object of the present invention is to facilitate separation of the mixed waste stream, by utilizing a single fan or blower which generates a single air curtain or stream of air, into a heavy weight first fraction, a lightweight second fraction, and a super lightweight third fraction.

Another object of the present invention is to utilize a single air curtain or stream of air to initially separate the mixed waste stream into a heavy weight material or fraction and a combined material or fraction comprising both a lightweight material or fraction and a super lightweight material or fraction and, thereafter, subsequently separate, using the same stream of air, the combined material or fraction into a lightweight material or fraction and a super lightweight material or fraction and thereby assists with classification and/or recycling of the mixed waste material into three separate and distinct materials or fractions.

A further object of the present invention is to utilizing a rotatable perforated or permeable member, e.g., a roller, a belt or a screen, to assist with separating the super lightweight portion or fraction from the lightweight portion or fraction, during a classification or separation process which occurs within a rear section of the separation and classification equipment.

Yet another object of the present invention is to collect the stream of air, passing through the separation and classification equipment, and recycle the same to an inlet of the single fan or blower so as to assist with maintaining negative pressure within the rear section of the separation and classification equipment and thereby further assist with maintaining the super lightweight fraction in engagement with the perforated or permeable member, e.g., a roller, a belt or a screen.

A further object of the present invention is to directly vent or exhaust the stream of air, after passing through the separation and classification equipment, into the external or surrounding environment.

The present invention also relates separation and classification equipment for separating a mixed waste stream into a heavier weight first fraction, a lightweight second fraction, and a super lightweight third fraction, the separation and classification equipment comprising: an inlet for feeding the mixed waste stream toward a gap located in a first section of the separation and classification equipment; a blower for discharging an stream of air at the mixed waste stream, as the mixed waste stream falls through the gap and separating the lightweight second fraction and the super lightweight third fraction from the heavier weight first fraction such that the heavier weight first fraction falls through the stream of air and collects in a heavier weight first collection area while the stream of air carries the lightweight second fraction and the super lightweight third fraction away from the gap and toward a second section of the separation and classification equipment; and a rotatable permeable member being arranged in the second section of the separation and classification equipment, the rotatable permeable member permitting the stream of air to pass therethrough such that, as the stream of air passes through the rotatable permeable member, the super lightweight third fraction tends to be forced against and retained by a surface of the rotatable permeable member and be conveyed, by the rotatable permeable member, toward a super lightweight third collection area while the lightweight fraction separates, from both the rotatable permeable member and the super lightweight third fraction, and collects in a separate lightweight second collection area.

The present invention also relates to method of separating a mixed waste stream into a heavier weight first fraction, a lightweight second fraction, and a super lightweight third fraction, using separation and classification equipment, the method comprising: feeding the mixed waste stream through an inlet toward a gap located in a first section of the separation and classification equipment; discharging an stream of air at the mixed waste stream, via a blower, as the mixed waste stream falls through the gap; separating the lightweight second fraction and the super lightweight third fraction from the heavier weight first fraction by permitting the heavier weight first fraction to fall through the stream of air; collecting the heavier weight first fraction in a heavier weight first collection area while carrying away from the gap, via the stream of air, the lightweight second fraction and the super lightweight third fraction toward a second section of the separation and classification equipment; and arranging a rotatable permeable member in the second section of the separation and classification equipment, and the rotatable permeable member permitting the stream of air to pass therethrough such that, as the stream of air passes through the rotatable permeable member, the super lightweight third fraction is retained by a surface of the rotatable permeable member and conveyed, by the rotatable permeable member, toward a super lightweight third collection area while the lightweight fraction separates, from both the rotatable permeable member and the super lightweight third fraction, and collects in a separate lightweight second collection area.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-4, a brief description concerning the various components of a first embodiment of the present invention, namely, a Type 1 Enclosed Recirculating Air Classifier, will now be briefly discussed. As can be seen in those Figures, the present invention relates to a separation and classification equipment 2 which has an inlet 4 (see FIG. 1) for receiving a generally continuous supply or stream of a mixed waste material 6, e.g., typically comprising a super lightweight fraction 8, a lightweight fraction 10 and a heavier weight fraction 12, which are to be classified and separated by weight, via the separation and classification equipment 2, into three separate and distinct fractions or recyclable waste streams. An inlet end 14 of an endless feed conveyor or belt 16 is located adjacent the inlet 4 of the separation and classification equipment 2 and the feed conveyor or belt 16 facilitates conveying the substantially continuous supply of the mixed waste material 6 into the separation and classification equipment 2 for classification and separation by weight, as will be described below in further detail. A VFD controller 13 is connected to a drive motor 15 of the feed conveyor or belt 16 for adjusting or varying the rotational speed thereof. Typically, the feed conveyor or belt 16 rotates in a clockwise direction.

Figure 1:
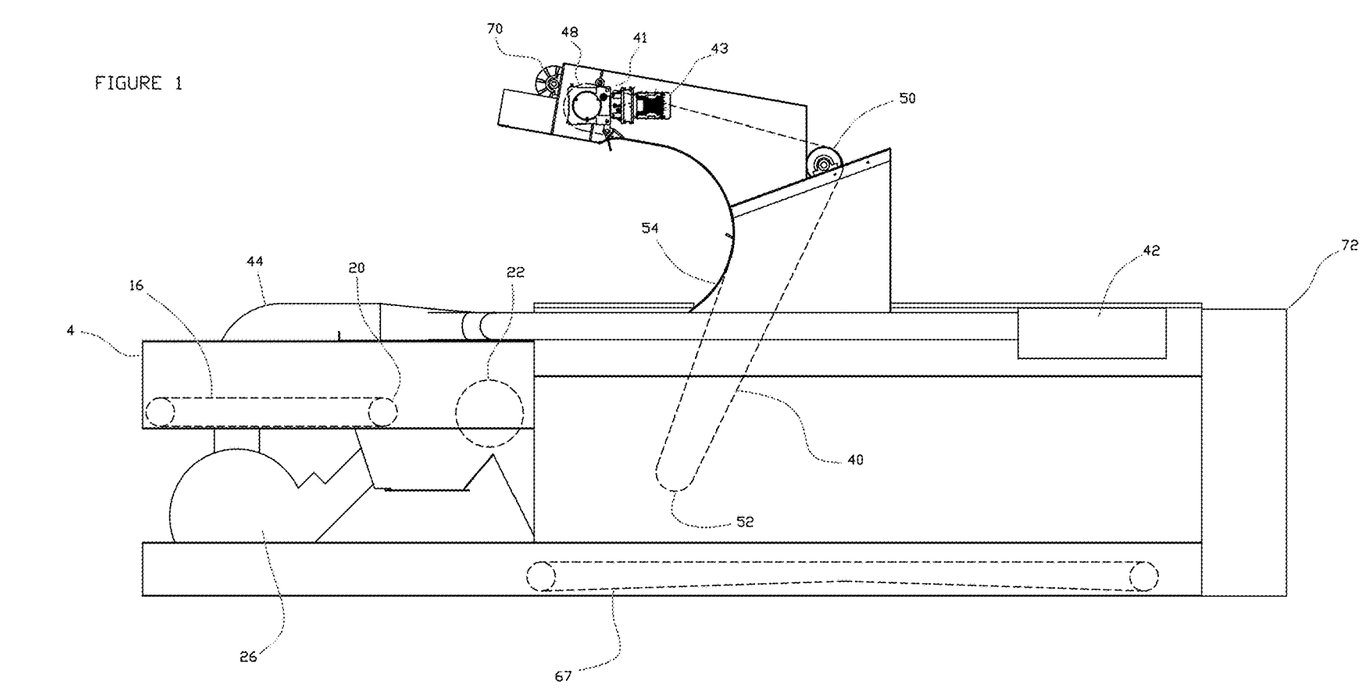
FIG. 1 is a diagrammatic side elevational view of a type 1 separation and classification equipment according to the invention.

As shown in FIG. 1, the feed conveyor or belt 16 is arranged in a substantially horizontal orientation so that the inputted mixed waste material 6 is deposited on and supported by a top surface of the feed conveyor or belt 16. The inputted mixed waste material 6 is conveyed, by the feed conveyor or belt 16, toward a discharge end 18 thereof. At the discharge end 18 of the feed conveyor or belt 16, the feed conveyor or belt 16 wraps around a head pulley 20, discharges the conveyed mixed waste material 6 into a gap 24 and returns back to the inlet 4 for conveyance of additional mixed waste material 6 for separation via the separation and classification equipment 2.

A rotating diverter 22 is horizontally spaced away from the head pulley 20, located at the discharge end 18 of the feed conveyor or belt 16. The respective widths of the rotating diverter 22 and the head pulley 20 as well as the spacing between the rotating diverter 22 and the head pulley 20 define a gap 24. The position of either, or both, the feed conveyor or belt 16 and/or the rotating diverter 22 are adjustable, relative to one another, in order to increase/decrease the size of the gap 24 and thereby assist with the separation of the heavy weight material or fraction 12 from the super lightweight material or fraction 8 and the lightweight material or fraction 10. The rotating diverter 22 typically rotates in a clockwise rotational direction. For some applications, the rotating diverter 22 may be replaced with a conventional separation knife or a separation plate (not shown in FIGS. 1-4, but see FIG. 6). As such conventional separation knifes and/or plates are well known in the art, a further detailed description concerning same is not provided.

A fan or blower 26 is typically located below the feed conveyor or belt 16. The fan or blower 26 is arranged to blow a stream of air 28 through the gap 24, formed between the discharge end 18 of the feed conveyor or belt 16 and the rotating diverter 22. The fan or blower 26 is typically arranged to supply and direct the stream of air 28 through the gap 24 in a vertically inclined direction, e.g., generally forming an angle of about 40 degree to 80 degrees and typically about 45 degrees, with respect to a longitudinal axis A defined by the separation and classification equipment 2. The fan or blower 26 is a variable frequency drive (VFD)

driven or has ducting dampeners to adjust the airflow through the gap 24 to facilitate the desired separation of the heavy weight material or fraction 12 from a remainder of the conveyed mixed waste material 6.

As diagrammatically shown in FIG. 1, as the mixed waste material 6 is discharged at the discharge end 18 of the feed conveyor or belt 16, the mixed waste material 6 falls into the gap 24 and contacts/interacts with the stream of air 28 supplied by the fan or blower 26. During such contact/interaction, intimate mixing occurs between some of the constituents of the mixed waste material 6 and the stream of air 28. As a result of such mixing, the super lightweight material or fraction 8 and the lightweight material or fraction 10, contained within the mixed waste material 6, both generally intermix with and are carried vertically upwardly and rearward, away from the gap 24, by the stream of air 28 while only the heavier weight material or faction 12, contained within the mixed waste material 6, is sufficiently heavy and thus generally falls, drops or passes, due to gravity, downward through the gap 24 and the stream of air 28. Once the heavy weight material or fraction 12 passes through both the gap 24 and the stream of air 28, the heavy weight material 12 then continues falling, due to gravity, and is channeled, by one or more inclined surfaces or walls 30, through a heavy material discharge opening 32 of the separation and classification equipment 2. After passing through the heavy material discharge opening 32, the heavy weight material or fraction 12 is either collected within a heavy weight collection bin or deposited on a heavy material endless conveyor 33 (both of which are only diagrammatically shown as a heavy weight first collection area) for conveyance of the heavy weight material or fraction 12 away from the separation and classification equipment 2 to another area or facility for further processing of the heavy weight material or fraction 12.

As noted above, the super lightweight material or fraction 8 and the lightweight material or fraction 10 both generally intermix with and are carried away from the gap 24 by the stream of air 28, generated by the single fan or blower 26, and thus continue to flow along with the stream of air 28 over and around the rotating diverter 22 and through a passageway 34 which interconnects a front (first) section 36 with a rear (second) section 38 of the separation and classification equipment 2. As generally shown, the stream of air 28 flows around the rotating diverter 22, through the passageway 34 and into the rear section 38 of the separation and classification equipment 2 where separation of the super lightweight material or fraction 8 from the lightweight material or fraction 10 can then occur.

As the stream of air 28 exits the passageway 34 and enters the rear section 38 of the separation and classification equipment 2, the stream of air 28, along with both the super lightweight and the lightweight materials 8, 10, all continue flowing generally along the longitudinal axis A of the separation and classification equipment 2 toward a rotating perforated or permeable belt or screen 40, e.g., a rotatable permeable member. The perforated or permeable belt or screen 40 is generally arranged substantially normal to the stream of air 28 but is sufficiently permeable so as to readily permit the stream of air 28 to pass therethrough and continue flowing toward a rear most region of the rear section 38 of the separation and classification equipment 2. However, the perforated or permeable belt or screen 40 is sufficiently impermeable for both the super light and the lightweight materials or fractions 8, 10 so as to prevents any of the super light and the lightweight materials or fractions 8, 10 from passing therethrough. The perforated or permeable belt or screen 40 typically has an adjustable rotational speed to assist further with separation of the super lightweight material or fraction 8 from the lightweight material or fraction 10.

After passing through the perforated or permeable belt or screen 40, the stream of air 28 can then flow into one or more air stream inlets 42 (see FIGS. 2-4), general located at the far end of the rear section 38 of the separation and classification equipment 2. The one or more air stream inlets 42 facilitate collection and returning of this air, via a return conduit 44, to an inlet 46 of the fan or blower 26 for another pass through the separation and classification equipment 2. This process of recycling the blown air is repeatedly repeated during operation of the separation and classification equipment 2.

Figure 2:
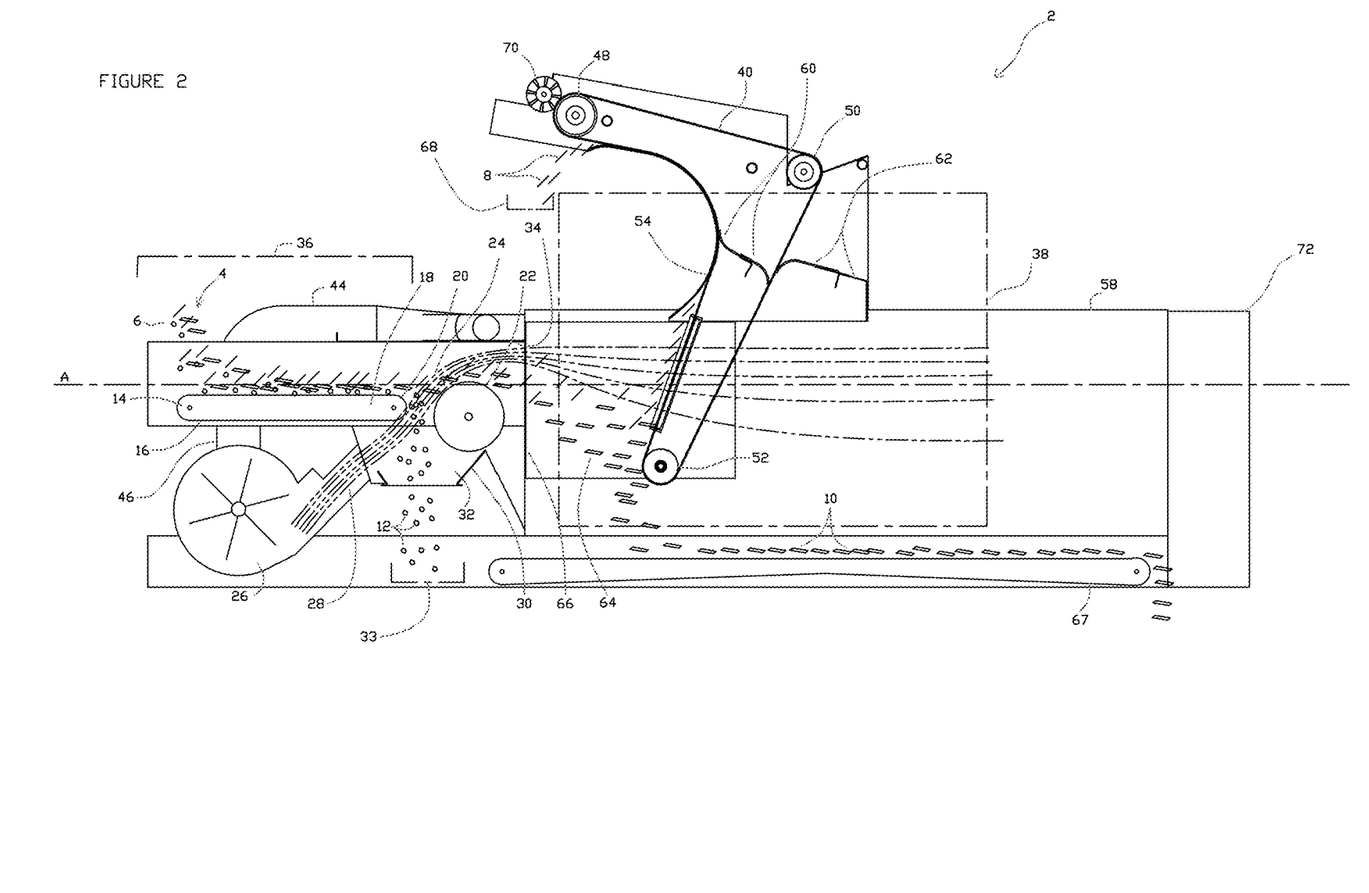
FIG. 2 is a diagrammatic cross sectional view of the separation and classification equipment of FIG. 1.
Figure 3:
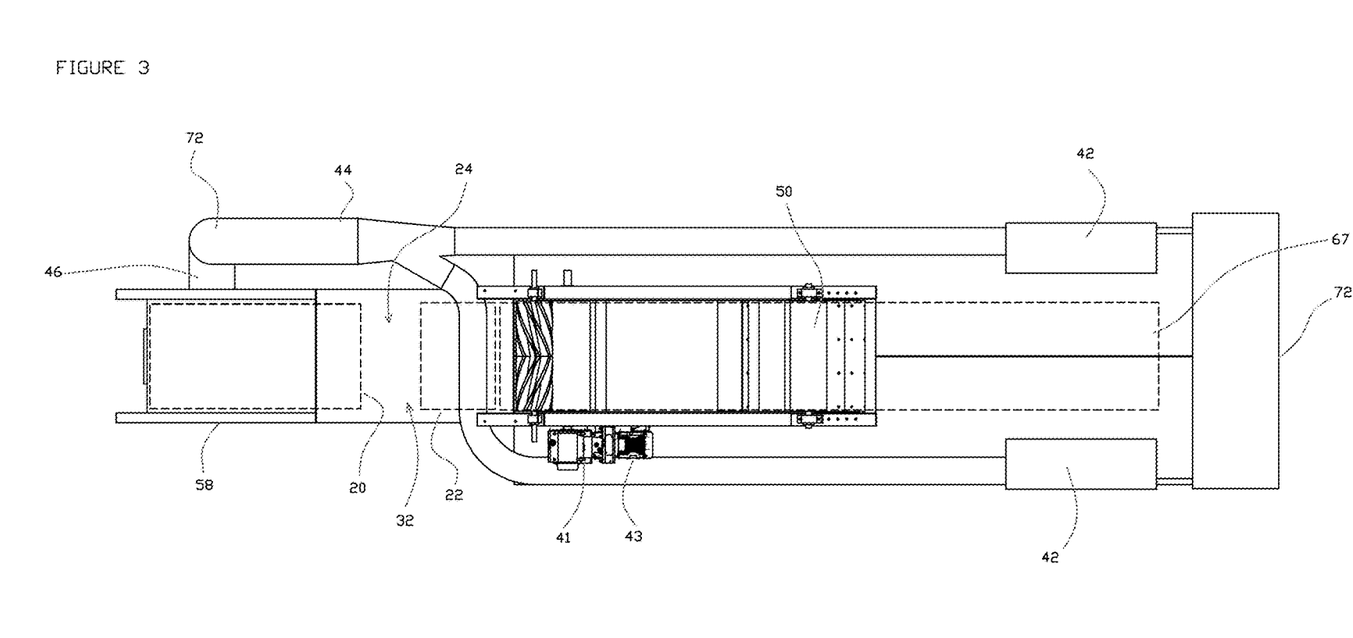
FIG. 3 is a diagrammatic top plan view of the separation and classification equipment of FIG. 1.
Figure 4:
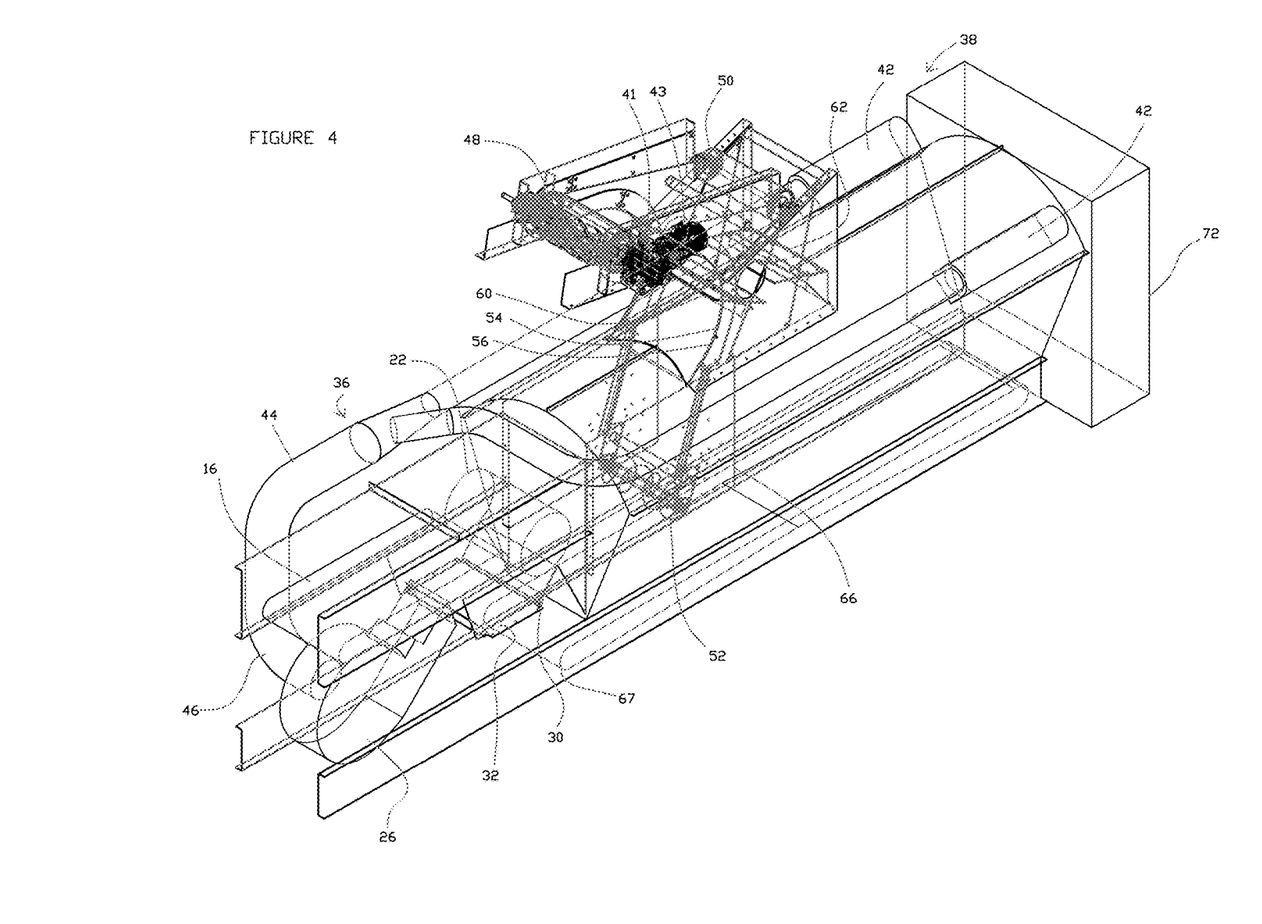
FIG. 4 is a diagrammatic three dimensional perspective view of the separation and classification equipment of FIG. 2.

As shown in FIG. 1 for example, the perforated or permeable belt or screen 40 typically is supported by a curved surface of a curved member 54 and a first head pulley 48, a second bend pulley 50 and a third tail pulley 52, which are each spaced apart from one another so as to provide sufficient tension to the perforated or permeable belt or screen 40. A motor 14 is typically coupled to the first head pulley 48 to supply rotational drive thereto and, in turn, rotate the perforated or permeable belt or screen 40 (see FIGS. 2-4). A controller 43 is connected to the motor 41 for adjusting or varying the rotational speed of the perforated or permeable belt or screen 40. As shown in FIGS. 1 and 2, the third tail pulley 52 is located slightly closer to the front section 36 of the separation and classification equipment 2 than a leading edge of the curved member 54. This results in the perforated belt or screen 40 forming an angle of slightly less than 90 degrees, e.g., between 65 degrees and 85 degrees, with respect to the longitudinal axis A of the separation and classification equipment 2. The angle that the perforated belt or screen 40 forms with respect to the longitudinal axis A is adjustable, via adjustment of the third tail pulley 52, and typically depends upon the separation requirements of the super light and the lightweight materials or fractions 8, 10. The inwardly facing curved surface 56 of the curved member 54 is securely attached to the housing 58 of the separation and classification equipment 2 and thus prevents any significant amount of air from escaping or flowing through such attachment.

A first longitudinal edge of a first (rubber) seal 60 is supported by the housing 58 and contacts, rubs and seals against an inwardly facing surface of a first portion of the perforated or permeable belt or screen 40, opposite the curved surface 56 of the curved member 54, while an opposed second longitudinal edge of the first (rubber) seal 60 contact, rubs and seals against an inwardly facing surface of another portion of the perforated or permeable belt or screen 40. A first longitudinal edge of a second (rubber) seal 62 is supported by the housing 58 and contacts, rubs and seals against an outwardly facing surface of the perforated or permeable belt or screen 40, opposite the first (rubber) seal 60, while an opposed second longitudinal edge of the second (rubber) seal 62 contacts and seals against the housing 58. Both the first and the second seals 60, 62 extend the full width of the housing 58 and seal against the lateral sidewalls of the housing 58. The first and the second seals 60, 62 permit a section of the perforated belt or screen 40 to travel into and out of the rear section 38 of the separation and classification equipment 2 while minimizing the amount of air which is permitted to escape and flow from the rear section 38 of the separation and classification equipment 2.

As noted above, the stream of air 28 transports the super lightweight and the lightweight materials or fractions 8, 10 toward the perforated or permeable belt or screen 40. Since the perforated or permeable belt or screen 40 is permeable, the stream of air 28 readily flows through the perforated or permeable belt or screen 40 while the super lightweight material or fraction 8 tends to be forced and retained against the exterior surface of the perforated or permeable belt or screen 40 due to the continuous flow of the stream of air 28 flowing through the passageway 34 toward the perforated or permeable belt or screen 40.

The lightweight material or fraction 10, on the other hand, tends to impact against and bounce off from the perforated or permeable belt or screen 40, due to its relatively small size and greater density, and fall, due to gravity, toward a lightweight material discharge opening 64, which is located in a vertically bottom most region of the rear section 38 of the separation and classification equipment 2. To assist with collection of the lightweight material or fraction 10, the lightweight material or fraction 10 may be channeled, by one or more inclined surfaces or walls 66, through the lightweight material discharge opening 64 of the separation and classification equipment 2. The lightweight material or fraction 10 is either collected within a lightweight material collection bin or deposited on a lightweight material conveyor 67 (both of which are only diagrammatically shown as a lightweight second collection area) for conveyance of the collected weight material or fraction 10 away from the separation and classification equipment 2 to another area or facility for further processing of the lightweight material or fraction 10.

The super lightweight material or fraction 8, on the other hand, is generally is sufficiently light enough so that the stream of air 28 forces and retains the super lightweight material or fraction 8 against the exterior surface of the perforated or permeable belt or screen 40. That is, the substantially continuous flow of the stream of air 28 constantly maintains the super lightweight material or fraction 8 in intimate contact and engagement with the surface of the perforated or permeable belt or screen 40. As a result this, the super lightweight material or fraction 8 is conveyed along with the perforated or permeable belt or screen 40 as the perforated or permeable belt or screen 40 rotates in a clockwise direction from the bottom region toward the top region of the rear section 38 of the separation and classification equipment 2.

As generally shown in FIG. 1, the perforated or permeable belt or screen 40 eventually engages with and is guided by and slides around a curved member 54. A leading edge of this curved member 54 is spaced from the perforated or permeable belt or screen 40 and generally sealed with respect to the housing 58. The leading edge of this curved member 54 thereby generally forms a funnel which assists with channeling and compressing the super lightweight material 8, between the curved surface of the curved member 54 and the exterior surface of the perforated or permeable belt or screen 40, as the perforated or permeable belt or screen 40 rotates, glides or slides around the curved member 54. The stream of air 28 generally maintains the super lightweight material or fraction 8 in engagement with the perforated or permeable belt or screen 40 until the super lightweight material or fraction 8 eventually engages with the surface of the curved member 54. As soon as the super lightweight material or fraction 8 reaches the curved surface of the curved member 54, the super lightweight material or fraction 8 is then held against the perforated or permeable belt or screen 40 by the surface of the curved member 54 as the perforated or permeable belt or screen 40 is guided by and slides along and around the surface of the curved member 54.

At a trailing edge of the curved member 54, the perforated or permeable belt or screen 40 separates away from one another and the perforated or permeable belt or screen 40 gradually becomes spaced from the curved member 54. Such spacing, plus lack of flow of the stream of air 28 and gravity, facilitates separation and discharging of the super lightweight material or fraction 8 away from the perforated or permeable belt or screen 40. The super lightweight material or fraction 8 is typically guided by the outwardly facing surface of the curved member 54 toward a super lightweight material collection bin where the super lightweight material or fraction 8 is collected or is deposited on an endless super lightweight material conveyor 68 (both of which are only diagrammatically shown as a super lightweight third collection area) for conveyance away of the super lightweight material or fraction 8 away from the separation and classification equipment 2 to another area or facility for further processing of the lightweight material or fraction 8.

A conventional wire brush roller 70 is located adjacent the first head pulley 48 for removing any residual super lightweight material or fraction 8 which remains adhered or stuck to the exterior surface of the perforated or permeable belt or screen 40. This wire brush roller 70 also rotates in a clockwise rotational direction and brushes, in an opposite rotational direction to the travel direction of perforated or permeable belt or screen 40, to assist with substantially complete removal of any residual super lightweight material or fraction 8 from the perforated or permeable belt or screen 40.

An air filter 72 is typically provided, along the air return conduit 44, for filtering the recycled air prior to returning and supplying the recycled air back to the inlet 46 of the fan or blower 26 for a further pass through the separation and classification equipment 2. During the recycling process, typically about 10% of the recycled air is removed from the air return conduit 44, by the air filter 72, prior to the recycled air being returned back to the inlet 46 of the fan or blower 26 for a further pass through the separation and classification equipment 2, while the remaining air is supplied to the inlet 46 of the fan or blower 26.

It is to be appreciated that a majority of the access openings and discharge openings, which provide access to the separation and classification equipment 2, are generally sufficiently sealed, via conventional seals and baffles (not shown in further detail), in order to control the amount of air which is permitted either to exhaust from or flow into the separation and classification equipment 2. Such seals and baffles generally assist with maintaining at least the rear section 38, of the separation and classification equipment 2, at a slightly negative pressure. This arrangement also permits air to enter into the separation and classification equipment 2, via the inlet 4, which generally receives a continuous stream of the mixed waste material 6 and this air generally assists with replenishing the air removed via the filter 72 during recycling.

Figure 5:
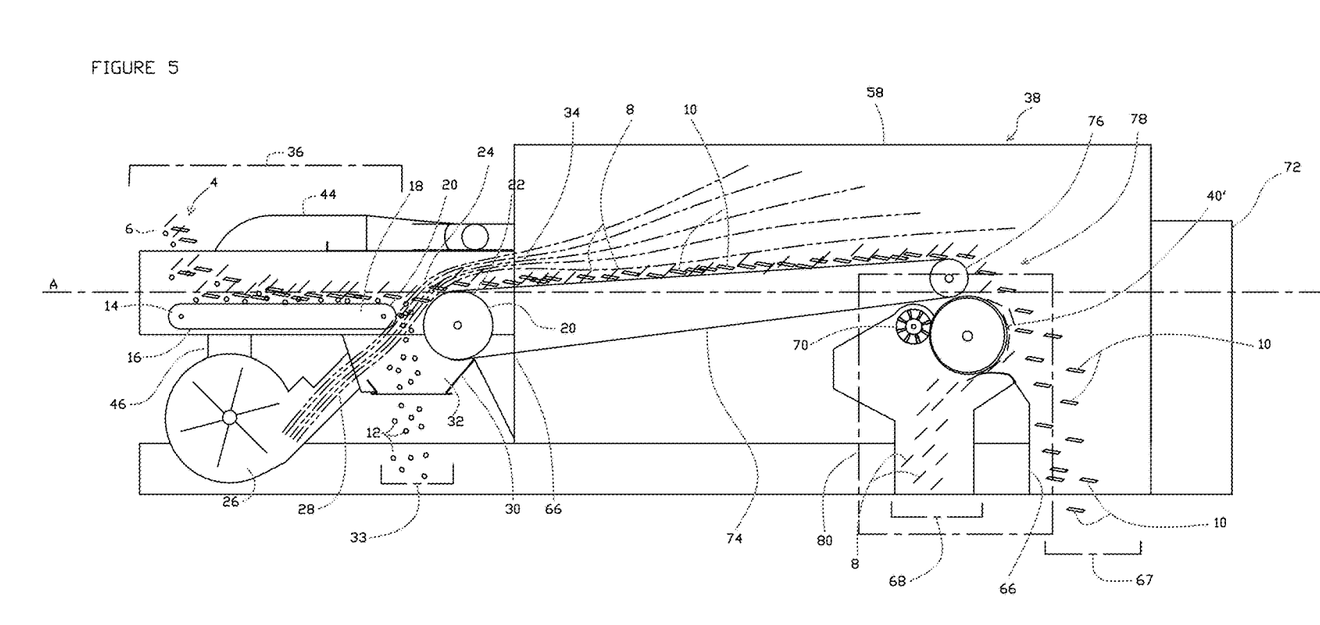
FIG. 5 is a diagrammatic side elevational view of type 2 separation and classification equipment according to the invention.

Turning now to FIG. 5, a second embodiment of the present invention, namely, a Type 2 Enclosed Air System with Rotation Drum Super Light Separator, will now be briefly discussed. As this embodiment is very similar in many respects to the previously discussed embodiment, only the differences between this new embodiment and the previous embodiment will be discussed in detail while similar/identical elements will be given identical reference numerals.

As can be seen in this embodiment, the present invention relates to a separation and classification equipment 2 which has an inlet 4 for receiving a generally continuous stream of a mixed waste material 6, e.g., a super lightweight material or fraction 8, a lightweight material or fraction 10 and a heavier weight material or fraction 12. An inlet end 14 of an endless feed conveyor or belt 16 is located adjacent the inlet 4 of the separation and classification equipment 2. At the discharge end 18 of the feed conveyor or belt 16, the feed conveyor or belt 16 wraps around a head pulley 20, discharges the conveyed mixed waste material 6 and returns back to the inlet 4 for conveyance of additional inputted mixed waste material 6 for separation by weight.

A rotating diverter 22 is also provided to assist with deflecting the heavier fraction 12 vertically downward. The rotating diverter 22 is horizontally spaced from the head pulley 20, located at the discharge end 18 of the feed conveyor or belt 16, and thereby defines a gap 24 between the rotating diverter 22 and the head pulley 20.

A fan or blower 26 is typically located below the feed conveyor or belt 16. The fan or blower 26 is arranged to blow a stream of air 28 through the gap 24, formed between the discharge end 18 of the feed conveyor or belt 16 and the rotating diverter 22. Similar to the previous embodiment, as the mixed waste material 6 is discharged from the feed conveyor or belt 16 at the discharge end 18 thereof, the mixed waste material 6 falls into the gap 24, formed between the head pulley 20 of the feed conveyor or belt 16 and the horizontally spaced rotating diverter 22. As the discharged mixed waste material 6 is discharged and falls into the gap 24, the mixed waste material 6 mixes with the stream of air 28 being supplied from the fan or blower 26. As such mixing occurs between the mixed waste material 6 and the stream of air 28, the super lightweight material or fraction 8 and the lightweight material or fraction 10, contained within the mixed waste material 6, generally intermix with and are carried upwardly away from the gap 24, by the stream of air 28, while the heavier weight material or fraction 12, contained within the mixed waste material 6, is sufficiently heavy and thus generally falls, drops or passes, due to gravity, downward through the stream of air 28.

Once the heavy weight material or fraction 12 passes through both the gap 24 and the stream of air 28, the heavy weight material 12 continues falling, due to gravity, and is channeled, by one or more inclined surfaces or walls 30, through a heavy material discharge opening 32 of the separation and classification equipment 2. After passing through the heavy material discharge opening 32, the heavy weight material or fraction 12 is either collected within a heavy material collection bin or deposited on a heavy material endless conveyor 33 (both of which are only diagrammatically shown as a heavy weight first collection area) for conveyance of the heavy weight material or fraction 12 away from the separation and classification equipment 2 to another area or facility for further processing of the heavy weight material or fraction 12.

As noted above, the super lightweight material or fraction 8 and the lightweight or fraction 10 both generally mix with and are carried away by the stream of air 28, generated by the single fan or blower 26, and thus continue to flow along with the stream of air 28 over and around the rotating diverter 22 and through a passageway 34 which interconnects a front section 36 with a rear section 38 of the separation and classification equipment 2. As generally shown, the stream of air 28 flows around the rotating diverter 22, through the passageway 34 and enters into the rear section 38 of the separation and classification equipment 2 where separation of the super lightweight material or fraction 8 from the lightweight material or fraction 10 can then occur.

According to this embodiment, an endless settling conveyor belt 74 extends between the rotating diverter 22 and a settling conveyor belt head pulley 76 which is accommodated within the second (expansion) section 38, adjacent a remote end thereof. As diagrammatically shown, the stream of air 28, the super lightweight material or fraction 8 and the lightweight material or fraction 10 flow through the passageway 34 and into the second (expansion) section 38 substantially parallel to both a top surface of the settling conveyor belt 74 and the longitudinal axis A of the separation and classification equipment 2.

As generally shown in FIG. 5, the transverse cross sectional area of the second (expansion) section 38 of the separation and classification equipment 2 gradually increases in size, relative to the transverse cross sectional area of the passageway 34. That is, the transverse cross sectional area of the second (expansion) section 38 typically increases in both height as well as width. As a result of this increase in cross sectional area, as the stream of air 28, the super lightweight material or fraction 8 and the lightweight material or fraction 10 all enter into the second (expansion) section 38, the speed or velocity of the stream of air 28, as well as the super lightweight material or fraction 8 and the lightweight material or fraction 10, all gradually decrease. Accordingly, both the lightweight material or fraction 10 and the super lightweight material or fraction 8 are permitted to gradually settle, due to the reduced air speed as well as gravity, on the top surface of the settling conveyor belt 74 as the settling conveyor belt 74 rotates toward the settling conveyor belt head pulley 76. The lateral side walls of the housing 58 are typically inclined to assist with channeling and directing both the super lightweight material or fraction 8 and the lightweight material or fraction 10 toward the centrally located the settling conveyor belt 74.

As a result of such arrangement, both the lightweight material or fraction 10 and the lightweight material or fraction 8, which settle on the top surface of the settling conveyor belt 74, are eventually conveyed to a discharge end 78 thereof and discharged directly on to an exterior surface of a rotating perforated or permeable drum 40', e.g., a rotatable permeable member. As shown, the rotating perforated or permeable drum 40' is located adjacent to but vertically below to the settling conveyor belt head pulley 76. The rotating perforated or permeable drum 40' is a generally hollow roller which permits air to flow therethrough from one exterior surface into the interior of the rotating perforated or permeable drum 40' and then exit from an opposed exterior surface of the rotating perforated or permeable drum 40'. That is, a first section of the rotating perforated or permeable drum 40' is in direct fluid communication with the second (expansion) section 38 while an opposed second section of the rotating perforated drum is in direct fluid communication with a super lightweight chamber 80 which facilitates collect of the super lightweight material or fraction 8. A first upper seal (not shown in detail) extends between an upper portion of the super lightweight chamber 80 and an exterior surface of the rotating perforated or permeable drum 40' while a second lower seal (not shown in detail) extends between a lower portion of the super lightweight chamber 80 and an opposed exterior surface of the rotating perforated or permeable drum 40'. The first and second seals 82, 84 each form a seal between the super lightweight chamber 80 and the second (expansion) section 38 to ensure that substantially all of the air, which enters into the super lightweight chamber 80, passes through the rotating perforated or permeable drum 40'.

An air intake (not shown in detail), for the fan or blower 26, is connected to one of the side walls of the super lightweight chamber 80 to facilitate withdrawing and recycling air from the super lightweight chamber 80 and supplying such withdrawn air to the inlet 46 of the fan or blower 26 for another pass through the separation and classification equipment 2. This process of recycling the air is repeatedly repeated during operation of the separation and classification equipment 2.

As the air inlet 46, for the fan or blower 26, withdraws air via the air intake located in from the super lightweight chamber 80, this creates a vacuum within the super lightweight chamber 80. This vacuum, in turn, induces air to flow from the second (expansion) section 38, through the rotating perforated or permeable drum 40', and into the super lightweight chamber 80. As the air flows through the rotating perforated or permeable drum 40', such air flow causes the super lightweight material or fraction 8 to be forced or retained against the exterior surface of the rotating perforated or permeable drum 40'. As a result of such induced air flow and due to rotation of the rotating perforated or permeable drum 40' in a clockwise rotational direction, the rotating perforated or permeable drum 40' eventually conveys the super lightweight material or fraction 8, which is forced against the exterior surface of the rotating perforated or permeable drum 40', inside the super lightweight chamber 80. Upon the super lightweight material or fraction 8 entering into the super lightweight chamber 80, the air flowing through the rotating perforated or permeable drum 40' now causes the super lightweight material or fraction 8 to become dislodged or separated from the exterior surface of the rotating perforated or permeable drum 40' and fall, due to gravity, toward a bottom of the super lightweight chamber 80 for collection.

It is to be appreciated that the air, as it passing through the rotating perforated or permeable drum 40', is generally accelerated, due to the relatively small cross sectional area of the rotating perforated or permeable drum 40'. However, as soon as such air enters into the super lightweight chamber 80, the air immediately decelerates. Such deceleration of the air along with gravity assists with permitting the super lightweight material or fraction 8 to fall toward the bottom of the super lightweight chamber 80 for collection.

As the super lightweight material or fraction 8 falls, due to gravity, toward the bottom of the super lightweight chamber 80 for collection, the super lightweight material or fraction 8 is typically guided by and collected within either a super lightweight material collection bin or deposited on a super lightweight material conveyor 68 (both of which are only diagrammatically shown as a super lightweight third collection area) for conveyance of the super lightweight material or fraction 8 away from the separation and classification equipment 2 to another area for further processing of the lightweight material or fraction 8.

A conventional wire brush roller 70 is located adjacent the second seal formed between the super lightweight chamber 80 and the second (expansion) section 38, for removing any residual super lightweight material or fraction 8 which remains adhered or stuck to the exterior surface of the rotating perforated or permeable drum 40'. This wire brush roller 70 also rotates in a clockwise rotational direction and brushes, in a direction opposite to the rotational travel direction of the rotating perforated or permeable drum 40, against the exterior surface of the rotating perforated or permeable drum 40' to assist with substantially complete removal of any residual super lightweight material or fraction 8 therefrom.

As diagrammatically shown, as both the super lightweight and the lightweight materials or fractions 8, 10 fall onto the rotating perforated or permeable drum 40', the lightweight material or fraction 10 tends to impact against and bounce off from the rotating perforated or permeable drum 40' and, due to its greater density and relatively smaller size and gravity, and fall toward a lightweight material discharge opening 64 which is located in a bottom section of the second (expansion) section 38 of the separation and classification equipment 2, adjacent the super lightweight chamber 80, while the super lightweight material or fraction 8, as noted above, tends to be forced and drawn against the exterior surface of the rotating perforated or permeable drum 40' by the air flowing though the rotating perforated or permeable drum 40' and into the super lightweight chamber 80.

If desire or necessary, the lightweight material or fraction 10 can be channeled, by one or more inclined surfaces or walls 66, into the lightweight material discharge opening 64 of the separation and classification equipment 2. The lightweight material or fraction 10 is either collected within a lightweight material collection bin or deposited on a lightweight material conveyor 67 (both of which are only diagrammatically shown as a lightweight second collection area) for conveyance away from the separation and classification equipment 2 to another location for further processing of the lightweight material or fraction 10.

As discussed above, the super lightweight material or fraction 8, on the other hand, is generally is sufficiently light enough such that the vacuum created within the super lightweight chamber 80 draws and retains the super lightweight material or fraction 8 against the exterior surface of the rotating perforated or permeable drum 40'. That is, the induced air flow constantly maintains the super lightweight material or fraction 8 in intimate contact and engagement with the exterior surface of the rotating perforated or permeable drum 40' as the rotating perforated or permeable drum 40' is rotated in a clockwise direction until, as discussed above, the super lightweight material or fraction 8 eventually enters into the super lightweight chamber 80. As the super lightweight material or fraction 8 enters into the super lightweight chamber 80, the super lightweight material or fraction 8 separates away from and is removed from the exterior surface of the rotating perforated or permeable drum 40' by the air flow through the rotating perforated or permeable drum 40' and gradually settles toward the bottom of the super lightweight chamber 80 for collection in the super lightweight material collection bin or on the endless super lightweight material conveyor 68 (both of which are only diagrammatically shown as a super lightweight third collection area).

After the stream of air 28 flows to the far end of the second (expansion) section 38 of the separation and classification equipment 2, the stream of air 28 may possibly flow through an stream of air outlet 42 and be directly exhausted into the external environment. Alternatively, the air may be collected and recycled, as with the first embodiment, through the separation and classification equipment 2.

Figure 6:
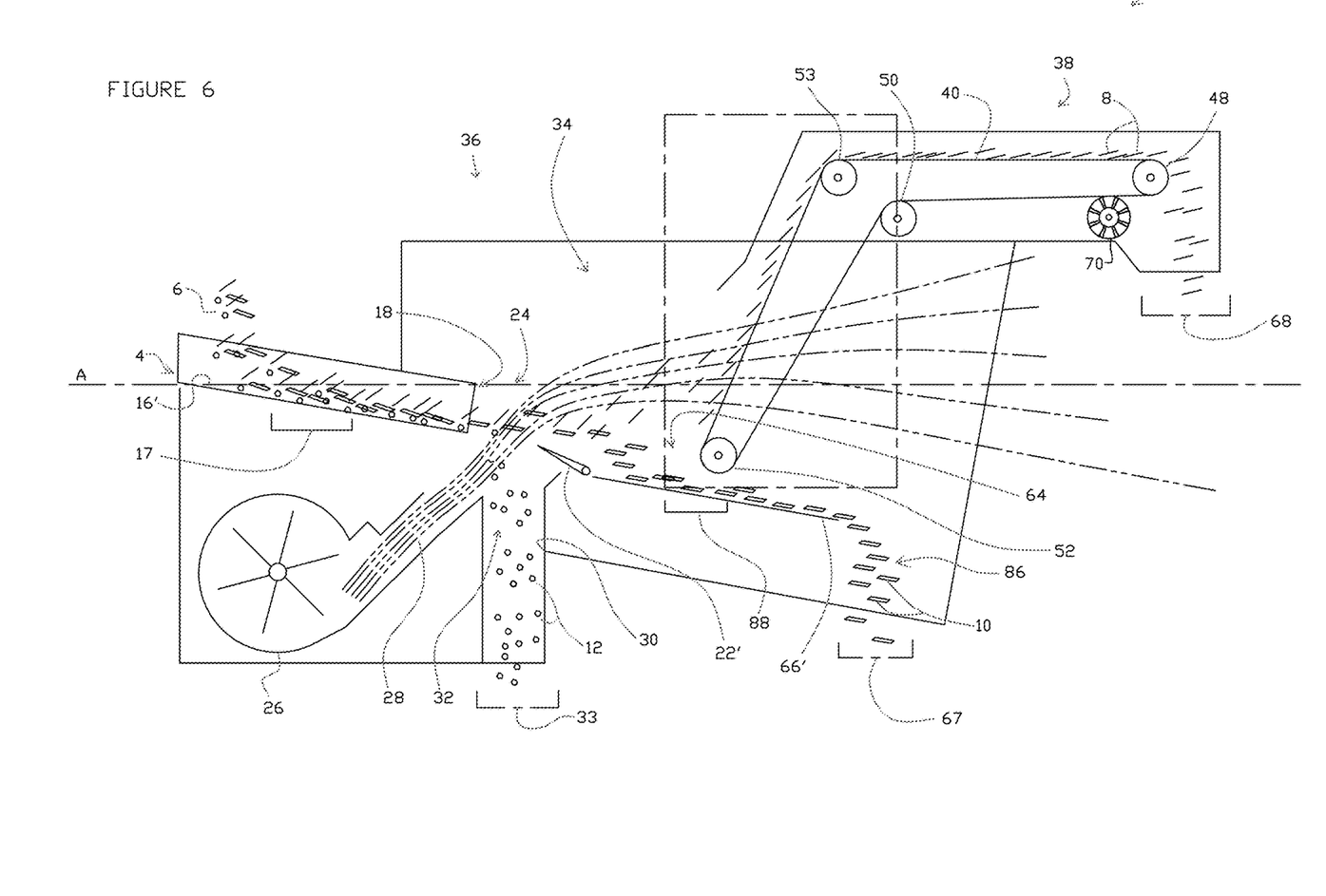
FIG. 6 is a diagrammatic side elevational view of type 3 separation and classification equipment according to the invention.

Turning now to FIG. 6, a third embodiment of the present invention, namely, a Type 3 Open Air System with Conveyor Belt Super Light Separator, will now be briefly discussed. As this embodiment is very similar in many respects to either one of the previously discussed embodiments, only the differences between this new embodiment and the previous embodiments will be discussed in detail while similar/identical elements will be given identical reference numerals.

According to this embodiment, a mixed waste material feed shoot 16' is arranged so that the inputted mixed waste material 6 is deposited on and guided by a top surface of the feed shoot 16' toward a discharge end 18 thereof. Typically, the feed shoot 16' is vibrated by a vibrator 17 to assist with uniform feeding of the inputted mixed waste material 6. At the discharge end 18 of the feed shoot 16', the mixed waste material 6 is discharged into a gap 24. According to this application, the rotating diverter is replaced with a conventional separation knife or a separation plate 22'. As such conventional separation knifes and/or plates are well known in the art, a further detailed description concerning function and purpose of same is not provided.

As shown, the discharge end 18 of the feed shoot 16' is horizontally spaced from the separation plate 22' and defines the gap 24 therebetween. The position of either, or both, the discharge end 18 of the feed shoot 16' and/or the separation plate 22' are adjustable, relative to one another, in order to increase/decrease the size of the gap 24 and thereby aid in the separation of the heavy weight material or fraction 12 from the super lightweight material or fraction 8 and the lightweight material or fraction 10. In addition, the angular position of the separation plate 22', relative to the longitudinal axis A of the separation and classification equipment 2 is also adjustable to assist further with separation of the heavier material or faction 12 from the super lightweight material or fraction 8 and the lightweight material or fraction 10.

As with the prior embodiments, a fan or blower 26 is typically located below the feed conveyor or belt 16. The fan or blower 26 is arranged to blow a stream of air 28 up through the gap 24, formed between the discharge end 18 of the feed shoot 16' and/or the separation plate 22'. The fan or blower 26 is typically arranged to supply and direct the stream of air 28 through the gap 24 in a vertically inclined direction, e.g., generally forming an angle of about 40 degree to 80 degrees and typically about 45 degrees, with respect to the longitudinal axis A of the separation and classification equipment 2.

As diagrammatically shown in FIG. 6, as the mixed waste material 6 is discharged by the discharge end 18 of the feed shoot 16', the mixed waste material 6 falls into the gap 24, formed between the discharge end 18 of the feed shoot 16' and the separation plate 22' and contacts/interacts with the stream of air 28 supplied by the fan or blower 26. During such contact/interaction, mixing occurs between some of the constituents of the mixed waste material 6 and the stream of air 28. As a result of such mixing, the super lightweight material or fraction 8 and the lightweight material or fraction 10, contained within the mixed waste material 6, generally intermix with are carried vertically upwardly and rearward by the stream of air 28, away from the gap 24, while the heavier material or faction 12, contained within the mixed waste material 6, is sufficiently heavy and thus generally falls, drops or passes, due to gravity, downward through the stream of air 28. Once the heavy weight material or fraction 12 passes through both the gap 24 and the stream of air 28, the heavy weight material or fraction 12 continues falling, due to gravity, and is channeled, by one or more inclined surfaces or walls 30, through a heavy material discharge opening 32 of the separation and classification equipment 2. After passing through the heavy material discharge opening 32, the heavy weight material or fraction 12 is either collected within a heavy material collection bin or deposited on a heavy material endless conveyor 33 (both of which are only diagrammatically shown as a heavy weight first collection area) for conveyance of the heavy weight material or fraction 12 away from the separation and classification equipment 2 to another area or facility for further processing of the heavy weight material or fraction 12.

As noted above, the super lightweight material or fraction 8 and the lightweight or fraction 10 both generally mix with and are carried away by the stream of air 28, generated by the single fan or blower 26, and thus continue to flow along with the stream of air 28 over and around the separation plate 22' and through a passageway 34 which interconnects a front section 36 with a rear section 38 of the separation and classification equipment 2. As generally shown, the stream of air 28 flows over and around the separation plate 22', through the passageway 34 and into the rear section 38 of the separation and classification equipment 2 where separation of the super lightweight material 8 from the lightweight material 10 can then occur.

As generally shown, the transverse cross sectional area of the second (expansion) section 38 of the housing 58 gradually increases in size, relative to the transverse cross sectional area of the passageway 34. That is, the transverse cross sectional area of the second (expansion) section 38 typically increases in both height as well as width. As a result of this increase in cross sectional area, as the stream of air 28, the super lightweight material or fraction 8 and the lightweight material or fraction 10 all enter into the second (expansion) section 38, the speed or velocity of the stream of air 28, the super lightweight material or fraction 8 and the lightweight material or fraction 10, all gradually decrease.

Accordingly, the lightweight material or fraction 10 is gradually permitted to settle, via the reduced air speed and gravity, on a top surface of an inclined lightweight material feed shoot 66' which guides the lightweight material or fraction 10 toward a discharge end 86 thereof. Typically, the lightweight material shoot 66' is vibrated by a vibrator 88 to assist with uniform channeling and directing of the lightweight material or fraction 10 toward the discharge end 86 thereof. After the lightweight material or fraction 10 is discharged from the discharge end 86 of the lightweight material feed shoot 66', the lightweight material or fraction 10 falls toward a lightweight material discharge opening 64 which is located in a bottom section of the second (expansion) section 38 of the separation and classification equipment 2, while the stream of air 28 and the super lightweight material or fraction 8 both generally continue traveling along the longitudinal axis A of the separation and classification equipment 2 toward a rotating perforated or permeable belt or screen 40, e.g., a rotatable permeable member.

If desire or necessary, the lightweight material or fraction 10 can be channeled, by one or more inclined surfaces or walls, into the lightweight material discharge opening 64 of the separation and classification equipment 2. The lightweight material or fraction 10 is either collected within a lightweight material collection bin or deposited on a lightweight material conveyor 67 (both of which are only diagrammatically shown as a lightweight second collection area) for conveyance away from the separation and classification equipment 2 to another location for further processing of the lightweight material or fraction 10.

As with the previous embodiment, the perforated or permeable belt or screen 40 is sufficiently permeable so as to readily permit the stream of air 28 to pass therethrough and continue flowing toward a rear most area of the rear section 38 of the separation and classification equipment 2 but sufficiently impermeable to the super light and the lightweight materials or fractions 8, 10 so as to prevents the super light and the lightweight materials or fractions 8, 10 from passing therethrough. The perforated or permeable belt or screen 40 typically has an adjustable rotational speed.

After passing through the perforated or permeable belt or screen 40, the stream of air 28 can then be exhausted directly to the surrounding environment. Alternatively, the air may flow into one or more air stream inlets which facilitate collection and returning of this air, by a return conduit, to an inlet 46 of the fan or blower 26 for another pass through the separation and classification equipment 2.

The perforated or permeable belt or screen 40 typically is supported by a first head pulley 48, a second bend pulley 50, a third tail pulley 52 and a fourth bend pulley 53. A motor typically is coupled to the first head pulley 48 to supply rotational drive thereto and, in turn, drive the perforated or permeable belt or screen 40. As shown in FIG. 6, the third tail pulley 52 is located slightly closer to the front section 36 of the separation and classification equipment 2 than a leading edge of the curved member 54. This results in a leading surface of the perforated belt or screen 40 forming an angle of slightly less than 90 degrees, e.g., between 65 degrees and 85 degrees, with the longitudinal axis A of the separation and classification equipment 2. This angle is adjustable depending upon the separation requirements of the super lightweight material or fraction 8.

As noted above, the stream of air 28 initially transports both the super lightweight and the lightweight materials or fractions 8, 10 toward the perforated or permeable belt or screen 40. Since the perforated or permeable belt or screen 40 is permeable, the stream of air 28 readily flows through the perforated or permeable belt or screen 40 while the super lightweight material or fraction 8 tends to be forced against and retained by the exterior surface of the perforated or permeable belt or screen 40 due to the continuous flow of the stream of air 28 flowing through the passageway 34 toward the perforated or permeable belt or screen 40. As noted above, due to the decrease in air speed, the lightweight material 10 tends to settle on the inclined lightweight material feed shoot 66' prior to reaching the rotating perforated or permeable belt or screen 40.

Notwithstanding the reduction in the air speed, the super lightweight material or fraction 8 is generally sufficiently light enough so that the stream of air 28 continues to transport, force and retain the super lightweight material or fraction 8 against the exterior surface of the perforated or permeable belt or screen 40. That is, the substantially continuous flow of the stream of air 28 constantly maintains the super lightweight material or fraction 8 in intimate contact and engagement with the exterior surface of the perforated or permeable belt or screen 40. As a result, the super lightweight material or fraction 8 is conveyed along with the perforated or permeable belt or screen 40, as the perforated or permeable belt or screen 40 is driven and rotates from the bottom region toward the top region of the rear section 38 of the separation and classification equipment 2.

As generally shown in FIG. 6, the housing 58 is designed to permit a small portion of the stream of air 28 to flow vertically upward, along and around a top most portion of the perforated or permeable belt or screen 40. This air flow assists with retaining the super lightweight material or fraction 8 in intermit contact with the exterior surface of the perforated or permeable belt or screen 40 until the perforated or permeable belt or screen 40 wraps around the second bend pulley and commences traveling in a substantially horizontal direction.

At the discharge end of the perforated or permeable belt or screen 40, the super lightweight material or fraction 8 is deposited into either a super lightweight collection bin or is deposited on an endless lightweight conveyor 68 (both of which are only diagrammatically shown as a super lightweight third collection area) for conveying the super lightweight material or fraction 8 away from the separation and classification equipment 2 to another area or facility for further processing of the lightweight material or fraction 8. A conventional wire brush roller 70 is located adjacent the first head pulley 48 for removing any residual super lightweight material or fraction 8 which does not fall off the perforated or permeable belt or screen 40 into the super lightweight fraction collection bin or on the endless lightweight fraction conveyor 68 (both of which are only diagrammatically shown as a super lightweight third collection area) and thus remains adhered to the exterior surface of the perforated or permeable belt or screen 40. This wire brush roller 70 also rotates in a clockwise rotational direction and brushes, in an opposite rotational direction to the travel direction of perforated or permeable belt or screen 40, to assist with substantially complete removal of any residual super lightweight material or fraction 8 from the perforated or permeable belt or screen 40.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, I claim:

1. A separation and classification equipment for separating a mixed waste stream into a heavier weight first fraction, a lightweight second fraction, and a super lightweight third fraction, the separation and classification equipment comprising:
   a first section and a second section;
   an inlet for feeding the mixed waste stream toward a gap located in the first section of the separation and classification equipment;

a blower for discharging an stream of air at the mixed waste stream, as the mixed waste stream falls through the gap located in the first section and separating the lightweight second fraction and the super lightweight third fraction from the heavier weight first fraction such that the heavier weight first fraction falls through the stream of air and collects in a heavier weight first collection area while the stream of air carries the lightweight second fraction and the super lightweight third fraction away from the gap and toward the second section of the separation and classification equipment; and a rotatable permeable member being arranged in the second section of the separation and classification equipment, the rotatable permeable member permitting the stream of air from the blower to pass therethrough such that, as the stream of air passes through the rotatable permeable member, the super lightweight third fraction tends to be forced against and retained by a surface of the rotatable permeable member and be conveyed, by the rotatable permeable member, toward a super lightweight third collection area while the lightweight fraction separates, from both the rotatable permeable member and the super lightweight third fraction, and collects in a separate lightweight second collection area; and at least a portion of the stream of air, which passes through the rotatable permeable member, being returned back to an inlet of the blower, via an air return conduit, for a further pass through the separation and classification equipment.

2. The separation and classification equipment according to claim 1, wherein the rotatable permeable member comprises a perforated or permeable belt or screen which is arranged substantially normal to a flow of the stream of air from the blower and is sufficiently permeable so as to permit the stream of air from the blower to pass therethrough but is sufficiently impermeable with respect to both the super lightweight third fraction and the lightweight second fraction.

3. The separation and classification equipment according to claim 1, wherein an endless feed conveyor or belt is located adjacent the inlet of the separation and classification equipment, and the feed conveyor or belt facilitates conveying a substantially continuous supply of the mixed waste material into the separation and classification equipment for classification and the blower generates a negative pressure for the rotatable permeable member so that the stream of air passes through the rotatable permeable member and the super lightweight third fraction is forced against and retained by a surface of the rotatable permeable member.

4. The separation and classification equipment according to claim 3, wherein a controller facilitates adjusting or varying a rotational speed of the feed conveyor or belt.

5. The separation and classification equipment according to claim 3, wherein the gap is defined between a discharge end of the feed conveyor or belt and a rotating diverter which is spaced therefrom, and a size of the gap is adjustable by adjusting a position of at least one of the discharge end of the feed conveyor or belt and a rotating diverter.

6. The separation and classification equipment according to claim 5, wherein the blower is located so as to blow a stream of air through the gap, between the discharge end of the feed conveyor or belt and the rotating diverter in a vertically inclined direction which forms an angle of about 40 degree to 80 with respect to a longitudinal axis A defined by the separation and classification equipment.

7. The separation and classification equipment according to claim 6, wherein as the mixed waste material falls into the gap and contacts/interacts with the stream of air supplied by the blower, the super lightweight third fraction and the lightweight second fraction both intermix with and are carried away from the gap, by the stream of air, while the heavier weight faction falls through the gap and the stream of air toward the heavier weight first collection area.

8. The separation and classification equipment according to claim 5, wherein a passageway interconnects the first section with the second section of the separation and classification equipment and the stream of air, along with the intermixed super lightweight third fraction and the lightweight second or fraction, flows around the rotating diverter through the passageway into the second section of the separation and classification equipment.

9. The separation and classification equipment according to claim 2, wherein the perforated belt or screen is supported by at least three pulleys and a curved member, and a position of at least one of the three pulleys is adjustable for adjusting an angle formed by the perforated belt or screen with respect to a longitudinal axis defined by the separation and classification equipment.

10. The separation and classification equipment according to claim 9, wherein the curved member is attached to a housing of the separation and classification equipment and the perforated belt or screen is driven around the curved member to facilitate transporting the super lightweight third fraction toward the super lightweight third collection area.

11. The separation and classification equipment according to claim 10, wherein a controller facilitates adjusting or varying a rotational speed the perforated belt or screen.

12. The separation and classification equipment according to claim 2, wherein the stream of air, after passing through the perforated or permeable belt or screen, flows into at least one air stream inlet located in the second section of the separation and classification equipment which is connected to the return conduit which facilitates supplying recycled air to the inlet of the blower for subsequent pass through the separation and classification equipment, and an air filter is provided, along the air return conduit, for filtering the recycled air prior to returning and supplying the recycled air to the inlet of the blower for a subsequent pass through the separation and classification equipment.

13. The separation and classification equipment according to claim 2, wherein a plurality of seals, supported by a housing, seal against the perforated or permeable belt or screen to minimize air which is permitted to escape or flow into the second section of the separation and classification equipment.

14. The separation and classification equipment according to claim 2, wherein a wire brush roller is located adjacent a portion of an exterior surface of the perforated or permeable belt or screen for removing any residual super lightweight third fraction which remains adhered or stuck thereto.

15. The separation and classification equipment according to claim 5, wherein an endless settling conveyor belt extends between the rotating diverter and a settling conveyor belt head pulley which is accommodated within the second section, and the stream of air, the super lightweight third fraction and the lightweight second fraction, upon entering the second section, generally flow substantially parallel to both a top surface of the settling conveyor belt and a longitudinal axis defined by the separation and classification equipment.

16. The separation and classification equipment according to claim 15, wherein the rotatable permeable member comprises a rotating perforated or permeable drum which is a generally hollow roller which permits air to flow therethrough from one exterior surface into an interior of the rotating perforated or permeable drum and exit from an opposed exterior surface of the rotating perforated or permeable drum, and the rotating perforated or permeable drum is located adjacent a discharge end of the settling conveyor belt for receiving the super lightweight third fraction and the lightweight second fraction being discharged from the discharge end of the settling conveyor belt.

17. The separation and classification equipment according to claim 16, wherein the perforated or permeable drum is located between the second section and the super lightweight chamber, and the inlet of the blower draws air from the super lightweight chamber so as to create a vacuum therein, and this vacuum induces air to flow from the second section, through the rotating perforated or permeable drum, and into the super lightweight chamber, and as the air flows through the rotating perforated or permeable drum, such air flow causes the super lightweight third fraction to be retained against an exterior surface of the rotating perforated or permeable drum and be transported, by the rotating perforated or permeable drum, into the super lightweight chamber for collection by the super lightweight third collection area.

18. The separation and classification equipment according to claim 15, wherein a transverse cross sectional area of the second section of the separation and classification equipment gradually increases in size such that as the stream of air, the super lightweight third fraction and the lightweight second fraction enter the second section, a speed of the stream of air, a speed of the super lightweight third fraction and a speed of the lightweight second fraction all gradually decrease to facilitate settling of both the lightweight second fraction and the super lightweight third fraction on the settling conveyor belt.

19. The separation and classification equipment according to claim 1, wherein a feed shoot is provided for feeding the mixed waste material to the gap, and the feed shoot is vibrated by a vibrator to assist with feeding of the mixed waste material to the gap; and a lightweight material shoot is provided for directing the lightweight material second fraction toward the lightweight second collection area.

20. A method of separating a mixed waste stream into a heavier weight first fraction, a lightweight second fraction, and a super lightweight third fraction, using separation and classification equipment, the method comprising:
dividing the separation and classification into a first section and a second section;
feeding the mixed waste stream through an inlet toward a gap located in the first section of the separation and classification equipment;
discharging an stream of air at the mixed waste stream, via a blower, as the mixed waste stream falls through the gap located in the first section;
separating the lightweight second fraction and the super lightweight third fraction from the heavier weight first fraction by permitting the heavier weight first fraction to fall through the stream of air;
collecting the heavier weight first fraction in a heavier weight first collection area while carrying away from the gap, via the stream of air, the lightweight second fraction and the super lightweight third fraction toward the second section of the separation and classification equipment;
arranging a rotatable permeable member in the second section of the separation and classification equipment, and the rotatable permeable member permitting the stream of air from the blower to pass therethrough such that, as the stream of air passes through the rotatable permeable member, the super lightweight third fraction is retained by a surface of the rotatable permeable member and conveyed, by the rotatable permeable member, toward a super lightweight third collection area while the lightweight fraction separates, from both the rotatable permeable member and the super lightweight third fraction, and collects in a separate lightweight second collection area; and
returning at least a portion of the stream of air, which passes through the rotatable permeable member, back to an inlet of the blower, via an air return conduit, for a further pass through the separation and classification equipment.

* * * * *